(12) United States Patent
Iwane (10) Patent No.: US 8,237,097 B2
(45) Date of Patent: Aug. 7, 2012

(54) FOCUS DETECTING APPARATUS AND IMAGING APPARATUS HAVING CENTER POSITION DETECTION OF MICRO LENSES IN MICRO LENS ARRAY

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 2 days.

(21) Appl. No.: 12/976,502

(22) Filed: Dec. 22, 2010

(65) Prior Publication Data

US 2011/0091192 A1    Apr. 21, 2011

Related U.S. Application Data

(63) Continuation of application No. PCT/JP2009/055144, filed on Mar. 17, 2009.

(30) Foreign Application Priority Data

Jun. 30, 2008   (JP) ................................ 2008-170370

(51) Int. Cl.
G02B 7/04   (2006.01)
(52) U.S. Cl. .................................. 250/201.2; 250/208.1
(58) Field of Classification Search ............... 250/208.1, 250/201.2–201.8; 396/79–94, 111–121; 348/294–345
See application file for complete search history.

(56) References Cited

U.S. PATENT DOCUMENTS

| | | | |
|---|---|---|---|
| 5,825,016 A | 10/1998 | Nagahata et al. | |
| 7,924,342 B2 * | 4/2011 | Kusaka | 348/345 |
| 2006/0238622 A1 | 10/2006 | Shimosato | |
| 2007/0024738 A1 | 2/2007 | Kanai et al. | |

FOREIGN PATENT DOCUMENTS

| | | |
|---|---|---|
| JP | A-63-204236 | 8/1988 |
| JP | A-6-38089 | 2/1994 |
| JP | A-8-248303 | 9/1996 |
| JP | A-2003-207710 | 7/2003 |
| JP | A-2006-208495 | 8/2006 |
| JP | A-2006-323374 | 11/2006 |
| JP | A-2007-11314 | 1/2007 |
| JP | A-2007-41046 | 2/2007 |

OTHER PUBLICATIONS

International Search Report issued in International Application No. PCT/JP2009/055144 on Jul. 9, 2004 (with translation).

* cited by examiner

Primary Examiner — Que T Le
(74) Attorney, Agent, or Firm — Oliff & Berridge, PLC (57) ABSTRACT

A focus detecting apparatus includes: a micro lens array having plural micro lenses; a photo-detector having detecting elements corresponding with the micro lenses and receiving light flux from an optical system via the micro lenses; a center detector detecting a center position of each micro lens; an image generator generating an image from the center position of each micro lens and photo-detector output; a contrast detector detecting contrast values of an image signal of the image; a calculator calculating an integrated value by accumulating contrast values for each of plural partial images from the image; and a focus detector detecting focus adjustment status by calculating an image shift amount caused from light fluxes passed through different pupil areas of the optical system based on output of the detecting elements corresponding to the partial images from which a maximum value is obtained among the integrated values calculated by the calculator.

7 Claims, 8 Drawing Sheets

FOCUS DETECTING APPARATUS AND IMAGING APPARATUS HAVING CENTER POSITION DETECTION OF MICRO LENSES IN MICRO LENS ARRAY

INCORPORATION BY REFERENCE

The disclosure of the Japanese Patent Application No. 2008-170370 filed on Jun. 30, 2008 is herein incorporated by reference.

BACKGROUND OF THE INVENTION

1. Field of the Invention

The present invention relates to a focus detecting apparatus and an imaging apparatus.

2. Related Background of the Invention

Known in the art is an apparatus provided with micro lenses arranged two-dimensionally and a plurality of photo-detectors (photoelectric conversion elements) for each micro lens, to generate a pair of signal sequences corresponding to respective images caused from light fluxes having passed through different pupil areas of an imaging optical system on the basis of received light output obtained from the plurality of photo-detectors, and to detect a phase difference in the pair of signal sequences thereby detecting a focus adjustment status of the imaging optical system (refer to the Japanese Unexamined Patent Publication No. 2007-11314).

For the prior art focus detecting apparatus, however, it has been out of consideration to determine a signal sequence with high accuracy in focus detecting.

SUMMARY OF THE INVENTION

An object of the present invention is to provide a focus detecting apparatus and an imaging apparatus both capable of appropriately determining a signal sequence with high accuracy in focus detecting.

According to the first aspect of the present invention, there is configured a focus detecting apparatus comprising: a micro lens array arranged with a plurality of micro lenses; a photo-detector that has detecting elements provided in correspondence with the micro lenses and receives light flux from an optical system via the micro lenses; a center detecting means that detects a center position of each micro lens from a position of detecting element having conjugate relationship with a pupil position of the optical system; an image generating means that generates a two-dimensional image from the center position of each micro lens and an output of the photo-detector; a contrast detecting means that detects contrast values of image signal of the two-dimensional image; a calculation means that calculates an integrated value to be obtained by accumulating the contrast values for each of a plurality of partial images from the two-dimensional image; and a focus detecting means that detects a focus adjustment status by calculating an image shift amount caused from light fluxes having passed through different pupil areas of the optical system based on output of the detecting elements corresponding to any of the partial images from which a maximum value is obtained among the integrated values calculated by the calculation means.

According to the second aspect of the present invention, the focus detecting apparatus may be configured such that the contrast detecting means is a differentiation filter adapted to operate for output of the detecting elements, and contrast values within an area according to an arrangement size of the differentiation filter are eliminated.

According to the third aspect of the present invention, the focus detecting apparatus may be configured such that the calculation means calculates the integrated value after maximally weighting the contrast values corresponding to a center area of each partial image.

According to the fourth aspect of the present invention, the focus detecting apparatus may be configured such that the photo-detector has a plurality of the detecting elements for each of the plurality of micro lenses, and the contrast detecting means detects the contrast values of the image signal based on output obtained by a part of the plurality of detecting elements for each micro lens.

According to the fifth aspect of the present invention, the focus detecting apparatus may be configured such that the micro lens array is adapted to have the plurality of micro lenses arranged in a honeycomb structure, and the calculation means uses, as the partial images, images based on output of detecting elements corresponding to a plurality of rows of micro lenses arranged in the honeycomb structure.

According to the sixth aspect of the present invention, the focus detecting apparatus may be configured such that the contrast detecting means obtains output corresponding to a position between adjacent detecting elements by performing interpolation and uses the differentiation filter for the interpolated output thereby to detect the contrast values.

According to the present invention, it becomes possible to appropriately determine a signal sequence with high accuracy in focus detecting.

DESCRIPTION OF THE PREFERRED EMBODIMENTS

While illustrative embodiments will be hereinafter described with reference to the accompanying drawings wherein the present invention is applied to a single-lens reflex digital camera having an interchangeable lens, the present invention is applicable to any imaging apparatus which performs focus adjustment of a shooting lens or to a camera having a non-retractable lens.

Figure 1:
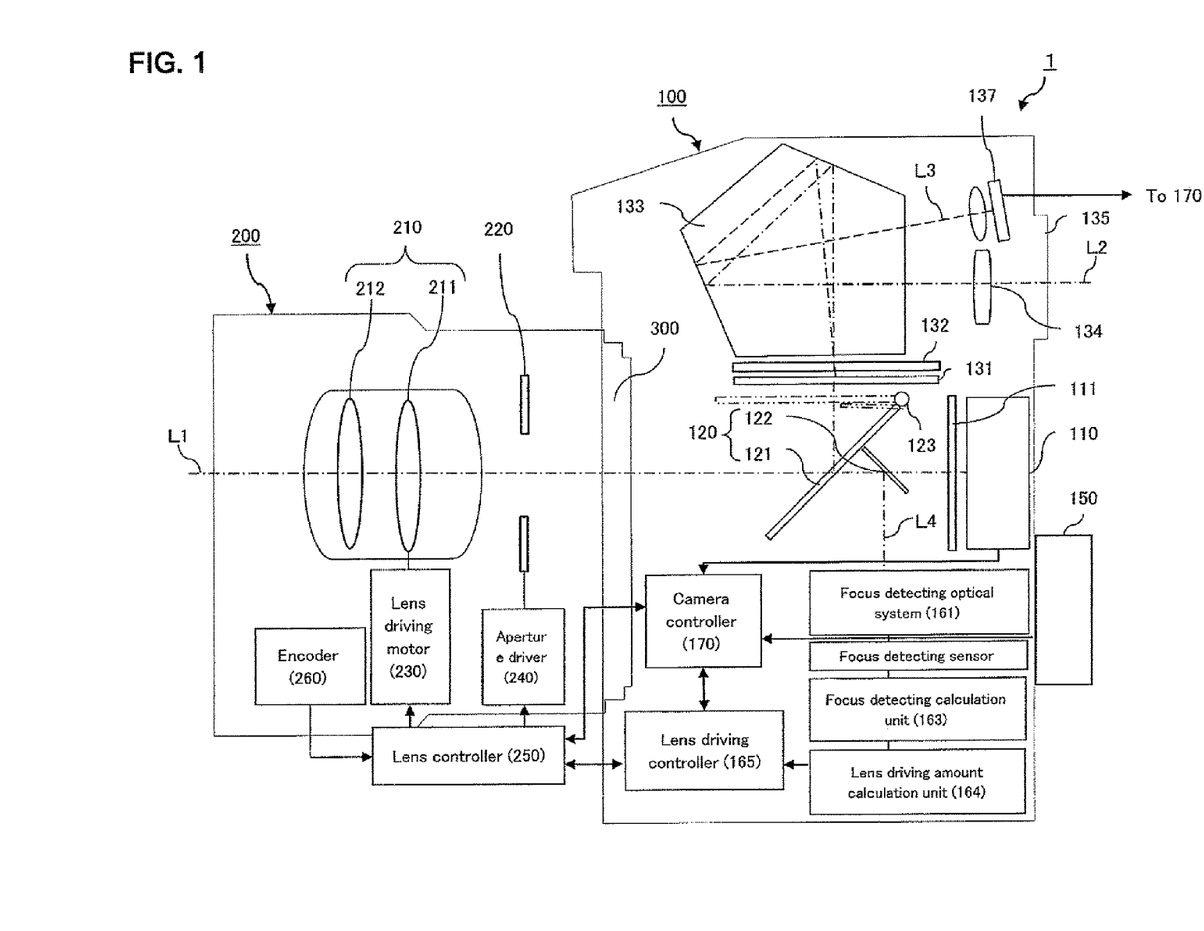
FIG. 1 is a block diagram illustrating a configuration in which an embodiment of the present invention is applied to a single-lens reflex digital camera.

FIG. 1 is a block diagram illustrating a configuration where an embodiment of the present invention is applied to a single-lens reflex digital camera 1 (hereinafter referred to as simply "camera 1").

The camera 1 according to the present embodiment is provided with a camera body 100 and a lens barrel 200. The camera body 100 and lens barrel 200 are detachably connected to each other by means of a mount 300.

The lens barrel 200 is provided therein with a shooting optical system which comprises shooting lenses 210 including a focus lens 211 and a zoom lens 212, an aperture device 220, and other components thereof.

The focus lens 211 is provided movably along an optical axis L1 thereof, and the position of focus lens 211 is adjusted by a lens driving motor 230 while the position or the travel distance of focus lens 211 is detected by an encoder 260. The focus lens 211 is movable in the direction of the optical axis L1 by rotation of a rotating barrel from one end position facing the camera body (near end) to the other end position facing a subject (far end). Note that information regarding the position or the travel distance of focus lens 211 detected by the encoder 260 is transmitted via a lens controller 250 to a lens driving controller 165. Also note that the lens driving controller 165 transmits a driving signal to the lens driving motor 230 via the lens controller 250 in accordance with a driving distance and/or a driving speed calculated based on a focus detecting result to be described hereinafter, and the lens driving motor 230 is driven by the driving signal.

The aperture device 220 has a configuration with an adjustable aperture size centering the optical axis L1 so as to limit an amount of light flux that reaches an image sensor 110 via the shooting lenses 210. Adjustment of the aperture size in aperture device 220 may be performed by obtaining a signal in dependence on an aperture value calculated in an automatic exposure mode, for example, and transmitting the obtained signal from a camera controller 170 to an aperture driver 240 via the lens controller 250. Alternatively, adjustment of the aperture size may be accomplished by setting an aperture value by manual operation at an operation board 150 provided on the camera body 100, and transmitting a signal with the set aperture value from the camera controller 170 to the aperture driver 240 via the lens controller 250. The aperture size of aperture device 220 is detected by an aperture size detector not shown, and the present aperture size is recognized by the lens controller 250.

The lens controller 250 is provided in the lens barrel 200. The lens controller 250, which is configured of a microprocessor and peripheral components such as memories, is electrically connected with the camera controller 170 to receive information regarding a defocus amount, an aperture controlling signal and the like from the camera controller 170 and transmit lens information to the camera controller 170.

In turn, the camera body 100 is provided with a mirror system 120 for guiding the light flux from a subject to the image sensor 110, a view finder 135, a photometric sensor 137 and a focus detecting optical system 161. The mirror system 120 comprises a quick return mirror 121 adapted to pivotally move around a pivot axis 123 within a predetermined angular range between an observing position to the subject and a shooting position to the subject, and a sub mirror 122 pivotally provided at the quick return mirror 121 and adapted to move pivotally in synchronization with the quick return mirror 121.

FIG. 1 illustrates two statuses of the mirror system 120, one for the observing position to a subject indicated by solid lines and the other for the shooting position to the subject indicated by two-dot chain lines. The mirror system 120 moves pivotally between the two statuses, that is, in the observing position to the subject, the mirror system 120 is positioned on the optical path of optical axis L1, while in the shooting position to the subject, the mirror system 120 escapes from the optical path of optical axis L1.

The quick return mirror 121 is configured as a half mirror. In the status of the observation position to a subject, the quick return mirror 121 reflects certain light fluxes (optical axes L2 and L3) extracted from the light flux from the subject (optical axis L1) to guide respectively toward the view finder 135 and the photometric sensor 137, and transmits the residual light flux (optical axis L4) to guide toward the sub mirror 122. In contrast, the sub mirror 122 is configured as a total reflection mirror, and guides the residual light flux (optical axis L4) transmitted through the quick return mirror 121 toward the focus detecting optical system 161.

Accordingly, when the mirror system 120 is positioned at the observing position, the light flux from a subject (optical axis L1) is guided to the view finder 135 and the focus detecting optical system 161, thereby allowing a photographer to observe the subject, and a calculation of exposure and a detection for a focus adjustment status of the focus lens 211 may be performed. Thereafter if the photographer fully presses a release button, then the mirror system 120 moves pivotally to the shooting position thereby to guide the light flux (optical axis L1) from the subject toward the image sensor 110, and the relevant image data is stored into a memory not shown.

The image sensor 110 is provided in the camera body 100 so as to be located on the optical axis L1 of the light flux from a subject and at a position to be a possible focusing plane, and a shutter 111 is provided to face the front surface of the image sensor 110. The image sensor 110 comprises a plurality of photoelectric conversion elements arranged two-dimensionally, and may be configured as a two-dimensional CCD image sensor, a MOS sensor, a CID, or the like.

When a shutter button included in the operation board 150 is fully pressed (i.e., at the time of shutter release), the shutter 111 provided to face the front surface of the image sensor 110 is released during the time period corresponding to the shutter speed set by a photographer or based on an exposure calculation result so as to expose the image sensor 110. The image sensor 110 photo-electrically converts the incident optical image into an electrical image signal, and the electrical image signal is stored into a memory not shown after being image processed in the camera controller 170. It is to be noted that the memory for storing the electrical image signal may be configured as a built-in memory, a card-type memory, or the like.

On the other hand, the light flux from the subject reflected by the quick return mirror 121 forms an image on a focal plane plate 131 arranged at a plane optically equivalent to the image sensor 110, and is then guided into an ocular globe of the photographer via a pentagonal prism 133 and an ocular lens 134. At this time, a transmissive-type liquid crystal display device 132 superimposes an indication such as a focus detecting area mark onto the image of a subject on the focal plane plate 131, and displays relevant information for shooting, such as a shutter speed, an aperture value, and the number of shootings, on an outer area not overlapping the image of the subject. This allows the photographer to observe both the subject and the back-ground thereof, and the relevant information for the shooting or the like, through the view finder 135 in a shooting standby status.

The photometric sensor 137, which is configured as a two-dimensional color CCD image sensor or the like, divides the shooting image into a plurality of areas to output a photometric signal in response to the luminance of each divided area. Image information obtained in the photometric sensor 137 is output to the camera controller 170 thereby to be utilized for an automatic exposure control.

The operation board 150, which includes the shutter release button and input switches for the photographer to set various operating modes, allows a photographer to select from AUTO FOCUS MODE/MANUAL MODE, or select from ONE SHOT MODE/CONTINUOUS MODE selectable especially in the AUTO FOCUS MODE. The shutter release button causes the shutter to be switched ON when being fully pressed. Other than this, when the shutter release button is half-pressed in the AUTO FOCUS MODE, the focusing operation of the focus lens is switched ON, whereas pulling away from the shutter release button turns OFF the focusing operation. Information relevant to various modes set by means of the operation board 150 is sent to the camera controller 170, and the camera controller 170 controls generally the operation of the camera 1.

The camera body 100 is provided therein with camera controller 170. The camera controller 170, which is configured of a microprocessor and peripheral components such as memories, is electrically connected with the lens controller 250 via an electric signal connector provided on the mount 300, receives lens information from the lens controller 250, and sends information including the defocus amount, the aperture controlling signal and the like to the lens controller 250. In addition, the camera controller 170 reads out image information from the image sensor 110 as described above, and after a certain information processing if required, the image information is output to a memory not shown. Furthermore, the camera controller 170 corrects the shooting image information and detects a status of focus adjustment of the lens barrel 200, a status of aperture adjustment and the like, thereby ruling general control of the camera 1.

The focus detecting optical system 161, a focus detecting sensor 162, a focus detecting calculation unit 163 and a lens driving amount calculation unit 164 shown in FIG. 1 constitute the focus detecting apparatus of phase difference detecting type, which detects a defocus amount representing the focus adjustment status of the shooting lenses 210.

The focus detecting apparatus according to the present embodiment will be described with reference to FIGS. 2 to 4C.

Figure 2:
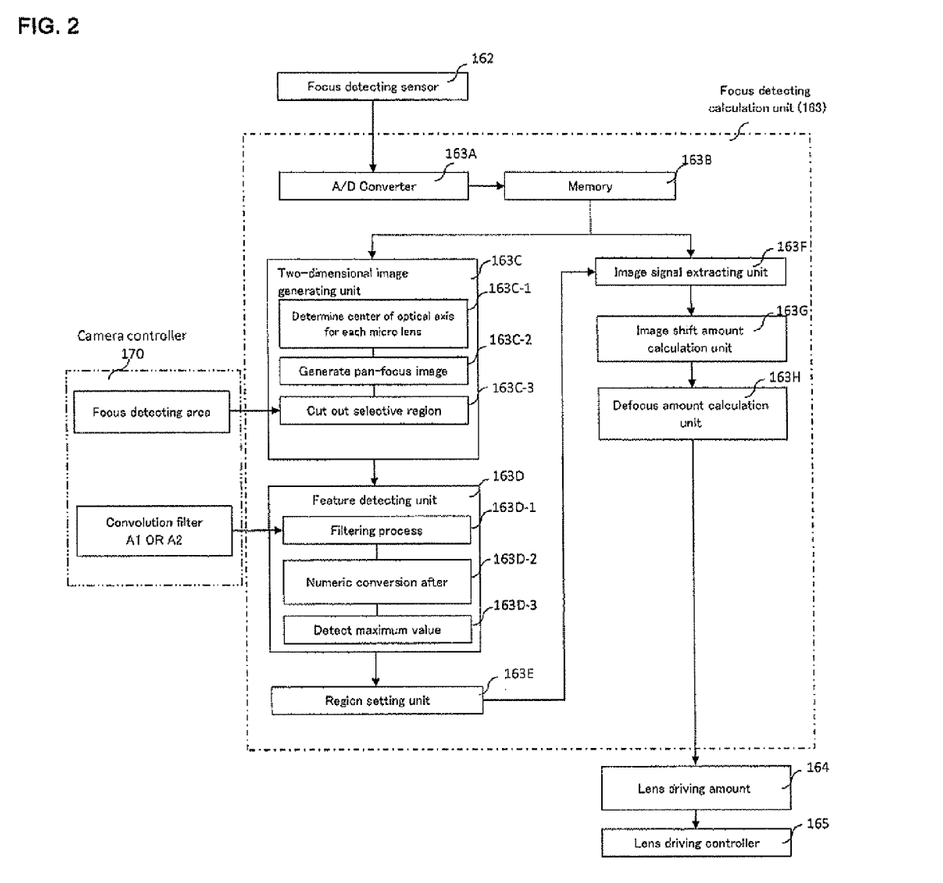
FIG. 2 illustrates the configuration of a focus detecting apparatus of the camera illustrated in FIG. 1.
Figure 3A:
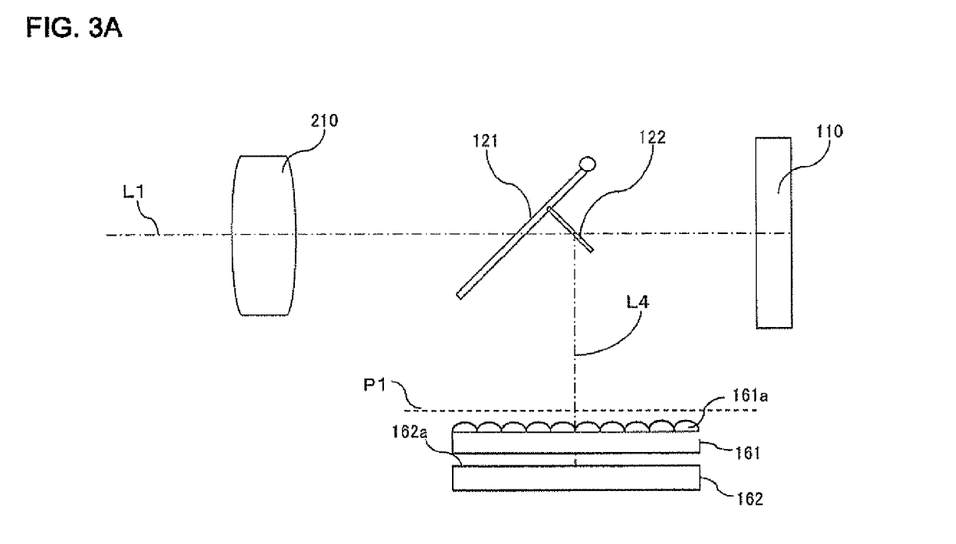
FIG. 3A illustrates an optical arrangement of the focus detecting apparatus of the camera illustrated in FIG. 1.

FIG. 2 is a block diagram illustrating the configuration of the focus detecting apparatus, wherein the configuration of the focus detecting calculation unit 163 illustrated in FIG. 1 is depicted in detail according to a processing procedure thereof. FIG. 3A illustrates an optical arrangement of the focus detecting apparatus, FIG. 3B is a plan view illustrating a placement relationship of the focus detecting optical system 161 and the focus detecting sensor 162 seen from the sub mirror 122 to the micro lens array 161, FIG. 3C is a cross-sectional view illustrating the focus detecting optical system 161 and the focus detecting sensor 162 (along line IIIC-IIIC in FIG. 3B), FIG. 3D is an enlarged plan view illustrating one micro lens 161a and focus detecting sensor 162, FIG. 4A and FIG. 4B illustrate shooting images observed through the view finder 135 shown in FIG. 1, and FIG. 4C is an enlarged view of the image IM shown in FIG. 4B

Figure 3B:
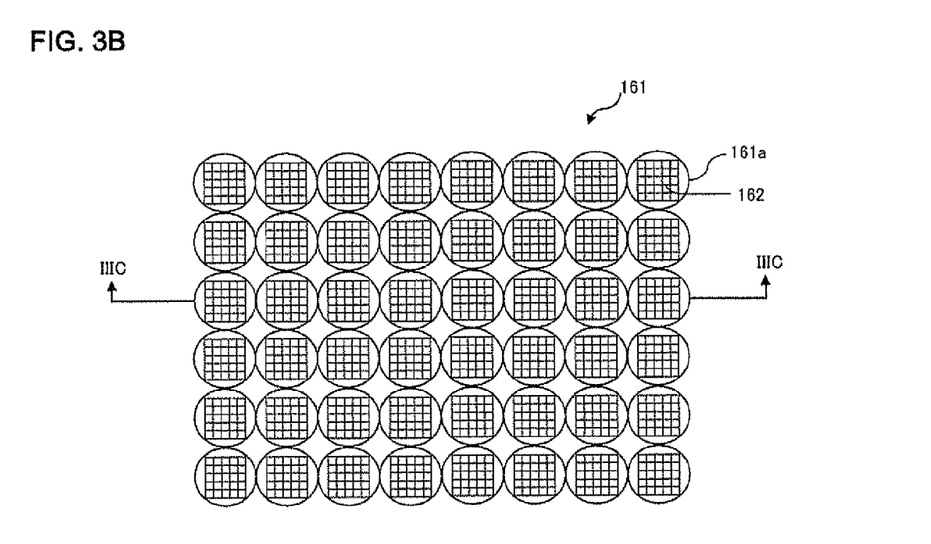
FIG. 3B is a plan view illustrating a placement relationship of a focus detecting optical system and a focus detecting sensor of the camera illustrated in FIG. 1.
Figure 4A:
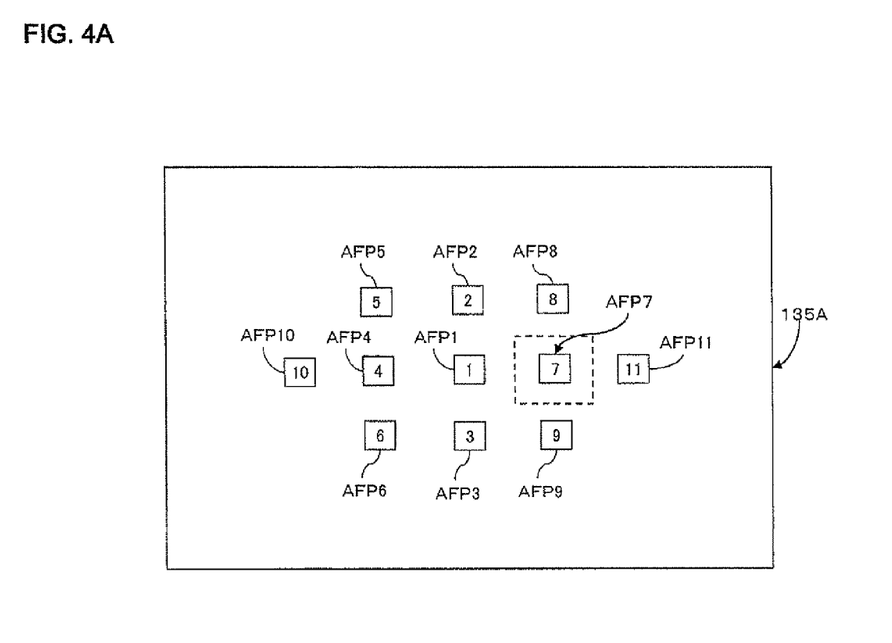
FIG. 4A illustrates a shooting screen observed through a view finder illustrated in FIG. 1.
Figure 4B:
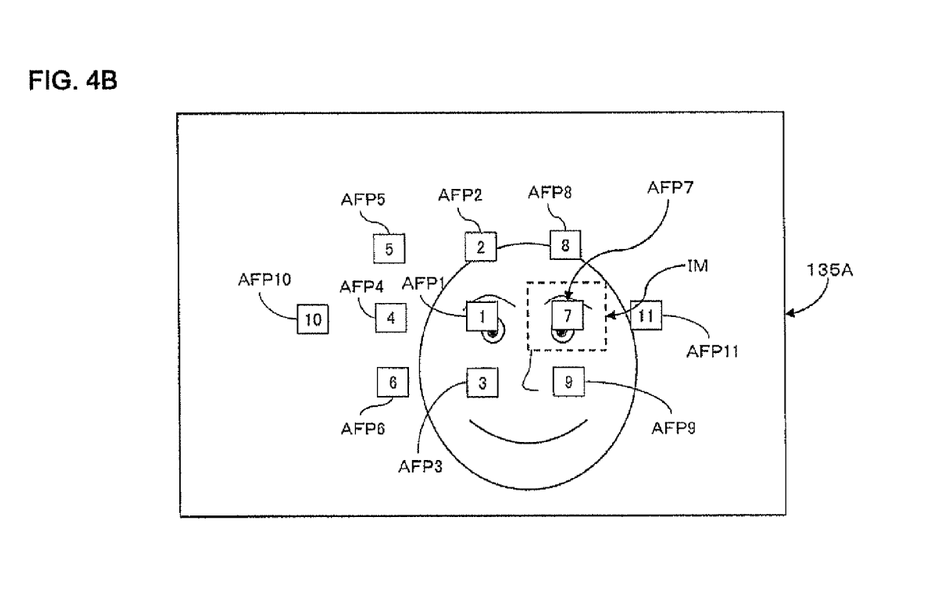
FIG. 4B also illustrates the shooting screen observed through the view finder illustrated in FIG. 1.
Figure 4C:
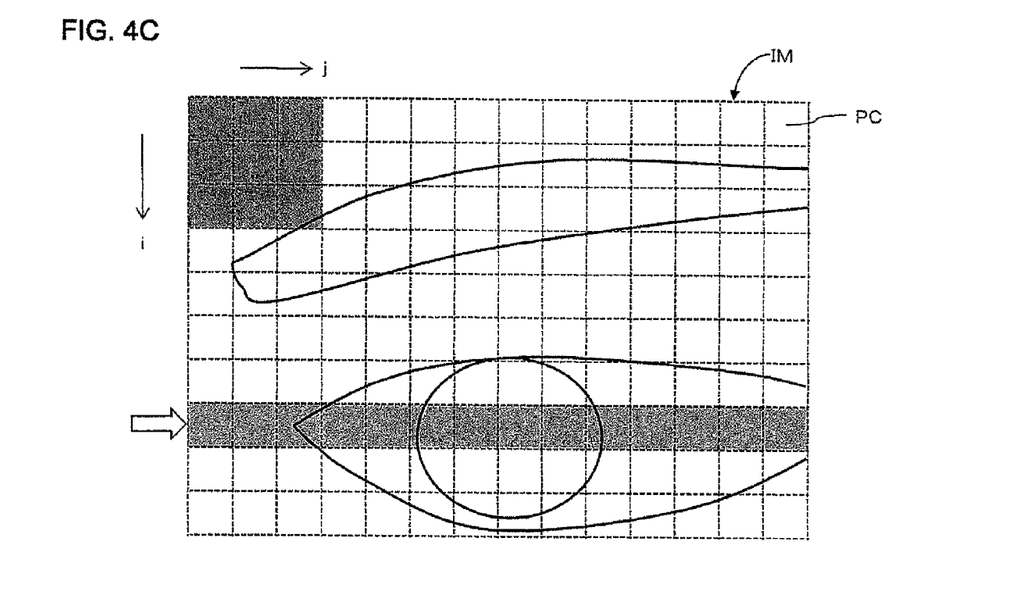
FIG. 4C is an enlarged view of an image IM illustrated in FIG. 4B.

As illustrated in FIG. 3B, the focus detecting optical system 161 is provided as a micro lens array adapted to have a plurality of micro lenses 161a arranged squarely and densely in a two-dimensional plane, and is allocated adjacent to a position P1 to be a possible focusing plane of the shooting lenses 210, as illustrated in FIG. 3A. Hereinafter, the focus detecting optical system 161 is also referred to as the micro lens array 161 using the same reference numeral. While the micro lens array 161 may be positioned just on the position P1 to be the possible focusing plane, the micro lens array 161 may be positioned alternatively on a point shifted away from the point P1 to be the possible focusing plane. Positioning just on the position P1 may causes a dead zone where the contrast in an image of a subject exists between micro lenses 161a, whereas shifted positioning from the position P1 may avoid the appearance of such dead zones.

Figure 3C:
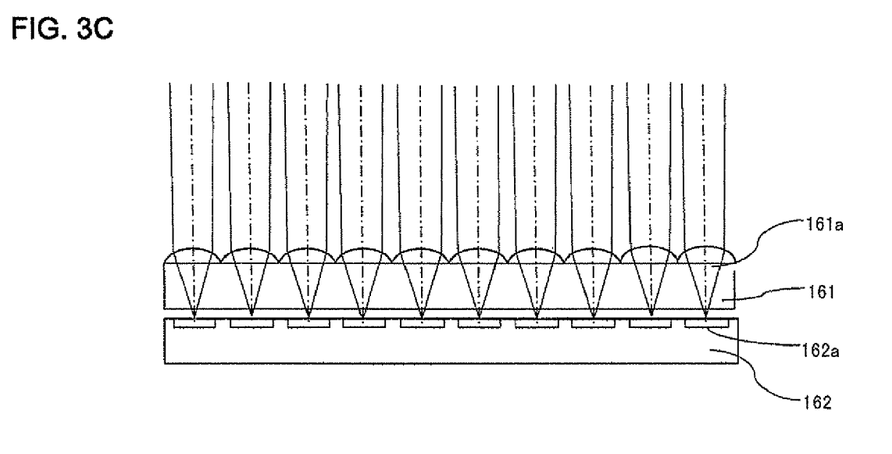
FIG. 3C is a cross-sectional view illustrating the focus detecting optical system and the focus detecting sensor of the camera illustrated in FIG. 1.
Figure 3D:
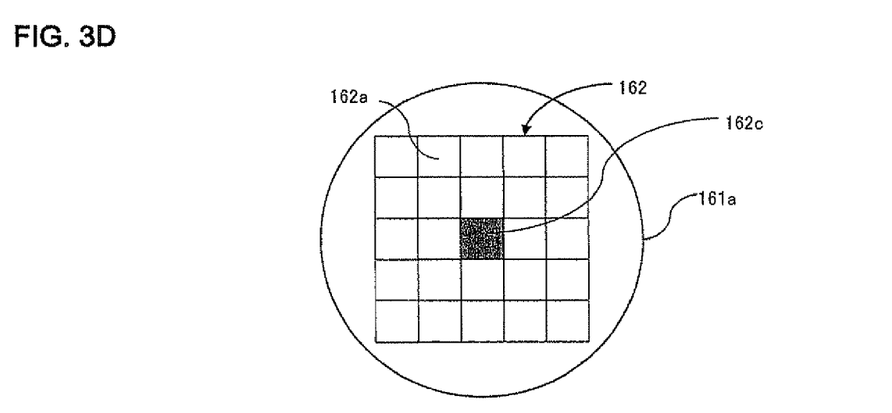
FIG. 3D is an enlarged plan view illustrating a certain portion of the focus detecting optical system and the focus detecting sensor of the camera illustrated in FIG. 1.

The focus detecting sensor 162 is provided as a photo-detector array adapted to have a plurality of photoelectric conversion elements 162a arranged squarely and densely in a two-dimensional plane, as illustrated in FIG. 3D, and is allocated approximately on focal points of the micro lenses 161a constituting the micro lens array 161, as illustrated in FIG. 3C. Hereinafter, the focus detecting sensor 162 is also referred to as the photo-detector array 162 using the same reference numeral. It is to be noted that FIG. 3C illustrates beam focusing of each light flux to be received by the photoelectric conversion element 162c corresponding to the center of each micro lens 161a or the area adjacent to the center.

In the present embodiment, each micro lens 161a is a circular-formed micro lens as illustrated in FIG. 3D, and the micro lens array 161 is provided with such circular-formed micro lenses 161a arranged squarely. Directions of up-and-down and right-and-left indicated in FIG. 3D are identical with those in an image picked up by the image sensor 110. Note that, by arranging regular hexagonal micro lenses 161a in a honeycomb structure in place of the circular-formed lenses, dead zones of focus detecting may be avoided from occurring between such circular-formed lenses, as will be described later in detail.

To the contrary, the photo-detector array 162 provided behind the micro lens array 161 is adapted to have a plurality of square-shaped photoelectric conversion elements 162a arranged squarely. Each photoelectric conversion element 162a is formed smaller than each micro lens 161a such that a plurality of photoelectric conversion elements 162a (vertical five elements by horizontal five elements in the example of FIG. 3D) are included in an area to which one micro lens 161a is projected perpendicularly, as enlarged and illustrated in FIG. 3D. Thus, these photoelectric conversion elements 162a are photoelectric conversion elements 162a provided so as to correspond to the micro lens 161a relevant thereto.

Incidentally, because the micro lens array 161 is positioned just on or approximately on the position P1 (a plane being optically equivalent to an imaging plane of the image sensor 110) to be the possible focusing plane of the shooting lenses 210, an optical image is projected onto the micro lens array 161 similarly onto the image sensor 110. There is obtained a pupil image of the shooting lenses 210 focused onto the photo-detector array 162 by each micro lens 161a. Each photoelectric conversion element 162a of the photo-detector array 162 corresponds to each part of the pupil. Therefore, by selecting appropriate photoelectric conversion elements 162a of photo-detector array 162 for each micro lens 161a to receive light from that micro lens 161a and combining signals therefrom, it is enabled to obtain an image picked up at a certain aperture determined by the selected photoelectric conversion elements 162a.

In the present embodiment, focus detecting is performed according to the procedure described hereinafter.

The focus detecting calculation unit 163 illustrated in FIG. 2 includes an A/D converter 163A which converts an analog image signal output from the focus detecting sensor (photo-detector array) 162 to a digital image signal to be output into a memory 163B. The memory 163B outputs the digital image signal in response to a demand from a two-dimensional image generating unit 163C and an image signal extracting unit 163F.

At this time, if either one area is selected from 11 (eleven) focus detecting areas (or auto focus points) AFP1 to AFP11 depicted in FIG. 4A, then the outputs are read out only from the photoelectric conversion elements 162a which are covered by the micro lenses 161a within a specific area corresponding to the selected focus detecting area AFP.

FIG. 4A illustrates a shooting screen 135A including focus detecting areas AFPs observed through the view finder 135, wherein the focus detecting areas AFP 1 to AFP 11 are provided at respective 11 (eleven) points in the shooting screen 135A in this case. This indication is accomplished by the liquid crystal display device 132 to superimpose eleven marks representing the positions of the focus detecting areas onto a subject image projected on the focal plane plate 131. In an operation, a photographer may select a desired focus detecting area AFP using the operation board 150, or an appropriate focus detecting point AFP is automatically selected by a prescribed sequence based on data such as automatic exposure data. For example, when the focus detecting area AFP7 is selected as illustrated in FIG. 4, the outputs are read out from the photoelectric conversion elements 162a corresponding to the micro lenses 161a in a specific area (indicated by dashed line in FIG. 4A) centered on the focus detecting point AFP7.

Referring again to FIG. 2, the two-dimensional image generating unit 163C determines the center of optical axis for each micro lens 161a (163C-1), and generates a pan-focus image from data reflecting the output of focus detecting sensor 162 stored in the memory 163B and the determined center of optical axis for each micro lens (163C-2). Thereafter, the two-dimensional image generating unit 163C receives information relevant to the focus detecting area, for example the focus detecting area AFP7 of FIG. 4A, selected as a focus detecting location, and extracts image data within the specific area centered on the focus detecting area from the generated pan-focus image to cut out a selective region (163C-3). For example, if the focus detecting area AFP7 is selected when shooting an image with the face of a person as shown in FIG. 4B, then image data of the coverage IM, indicated by dashed line in the same figure, including the focus detecting area AFP7, is cut out as the selective region. The image data cut out in such a manner is depicted in FIG. 4C.

Preceding the process for cutting out the selective region, it is required to calculate a pupil center position of the shooting lenses 210 in order to ensure the conjugate relationship with pupil as described above. The reason why of this is that the micro lens array 161 and the photo-detector array 162 are assembled in usual after being manufactured independently, and as such it is uncertain that which photoelectric conversion element 162a corresponds to which micro lens 161a and to which position on the corresponding micro lens 161a. Moreover, because it is expected that the lens barrel 200 may be interchanged for the single-lens reflex camera 1, the position of pupil of the shooting lenses 210 observed from each micro lens 161a possibly changes. Therefore, the position of the photoelectric conversion element 162a having a conjugate relationship with the center position of the pupil of shooting lenses 210 is determined as the center of micro lens 161a.

The position of photoelectric conversion element 162a corresponding to the center of each micro lens 161a may be obtained in accordance with the position (an image height) of the micro lens 161a from the optical axis L1 of shooting lenses 210 and a distance from the micro lens 161a to the pupil of shooting lenses 210. For example, when a lens barrel with known distance from the micro lens 161a to the pupil of shooting lenses 210 is used, the center position of the present shooting lenses 210 may be obtained through preliminarily memorizing a data group relevant to the center position of each micro lens 161a in the memory of lens controller 250 or the like, and calculating the center position of the present shooting lenses 210 by means of an interpolation or an extrapolation on the basis of the distance to the pupil of the present shooting lenses 210. This corresponds to the optical axis center determining block 163C-1 for each micro lens, in the two-dimensional image generating unit 163C illustrated in FIG. 2.

Thereafter, from the image data stored in the memory 16313, the image data of photoelectric conversion element(s) 162a corresponding to the obtained optical axis center of each micro lens 161a or corresponding to adjacent area around the center is extracted. Regarding the photo-detector array 162 having photoelectric conversion elements 162a of vertical five elements by horizontal five elements illustrated in FIG. 3D, the image data is extracted in terms of the center positioned photoelectric conversion element 162c depicted as filled area in the same figure, for example. This corresponds to the cutting out block 163C-3 for the selective image, in the two-dimensional image generating unit 163C illustrated in FIG. 2.

Note that, if the distance to the pupil of shooting lenses 210 is unknown, the center position to be used may be estimated as being obtained by the positional relationship between the micro lens 161a and the photoelectric conversion elements 162a on the assumption that the distance to the pupil is an infinite distance.

The two-dimensional image generated in two-dimensional image generating unit 163C in such a manner is identical with an image shot with the aperture corresponding to the photoelectric conversion element 162a. Assuming for example that the size of photoelectric conversion element 162a is 3 μm, the focal distance of micro lens 161a is 200 μm, and the distance from micro lens array 161 to the pupil is 70 mm, then the equivalent size of photoelectric conversion element 162a at the pupil is calculated as 1 mm, and a two-dimensional image is to be generated as being substantially equal to an image obtained through an aperture of 1 mmφ. For example, the focal distance of 50 mm for the shooting lenses 210 gives the F-value of 50, thereby generating a pan-focus image with deep focal depth. This corresponds to the pan-focus image generating block 163C-2 in the two-dimensional image generating unit 163C illustrated in FIG. 2.

Since the micro lens array 161 according to the present embodiment is adapted herein to have circular-formed micro lenses 161a arranged squarely as illustrated in FIG. 3B, the image data is also arranged squarely. Therefore, when generating a two-dimensional image, the image data may be converted as it stands to a pixel arrangement of square arrangement with equal intervals. Pixels PCs are assigned such that each pixel PC constituting the image IM illustrated in FIG. 4C corresponds to each micro lens 161a. Consequently, the value of each pixel PC is the output of photoelectric conversion element 162c corresponding to the center position of each micro lens 161a.

A feature detecting unit 163D illustrated in FIG. 2 detects a contrast by convolving the pan-focus two-dimensional image (refer to FIG. 4C) generated in the two-dimensional image generating unit 163C, and selects a signal sequence having largest integrated value for the contrast ("convolving" means herein performing convolution as a binary operation, wherein two functions f and g are added to each other while one of the functions being translated, thereby to produce a third function).

Figure 5:
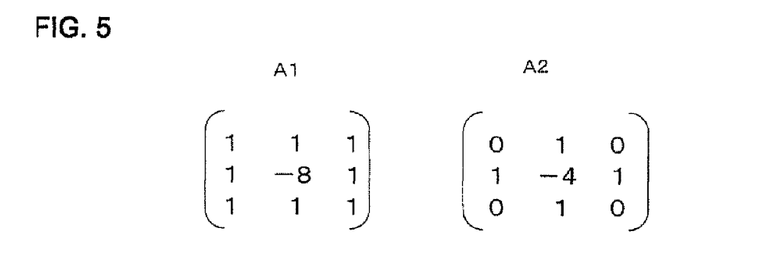
FIG. 5 illustrates matrices for an exemplary differentiation filter used in the focus detecting apparatus of the camera illustrated in FIG. 1.

This contrast detection may be performed by incorporating a differentiation filter into a convolution filter for two-dimensional image thereby imaging edges of an image having certain contrast. FIG. 5 shows exemplary matrices to be used in a differentiation filter applicable to the present embodiment.

FIG. 5 shows matrices A1 and A2 each providing Laplacian filter as a secondary differentiation filter for two-dimensional image: filter A1 is a filter which detects edge areas of contrast in four directions in terms of horizontal direction and vertical direction; and filter A2 is a filter which detects edge areas of contrast in eight directions in terms of horizontal direction and vertical direction, and two diagonal directions therebetween. Laplacian filter as a secondary differentiation filter is advantageous to detect a sharp image (high frequency image), and any of filters A1 and A2 may be used.

The feature detecting unit 163D executes filtering process (163D-1) using the above-described Laplacian filter A1 or A2 for the pan-focus two-dimensional image within the specific area centered on focus detecting area AFP7, as shown in FIG. 4C. This filtering process is initiated at the top-left window of three pixels by three pixels as a first processing target image data within the two-dimensional image data IM, as shown in the same figure, to perform a matrix operation. The matrix operation is in turn repeated sequentially while shifting the window one-pixel-by-one-pixel (one-column-by-one-column) in the horizontal direction (column-j direction). After completing the matrix operations for the first row (i=1), the window is shifted downward by one pixel (one row) in the vertical direction (row-i direction), and the matrix operation is repeated similarly from left to right with three pixels by three pixels.

Note that, if the filtering process is performed using either one of 3×3 matrices shown in FIG. 5 for the image data IM consisting of pixels of 10 rows by 14 column shown in FIG. 4C, matrix data sets of 8×12 are to be obtained. However, contrast may be eliminated for outermost pixels within the image data IM. Therefore, it is preferred that an extracting area of the image data IM is arbitrarily set in accordance with the size of filter matrix.

The feature detecting unit 163D calculates an integrated value I by accumulating contrast P obtained in terms of each row-i for whole of the specific area IM centered on the selected focus detecting area AFP7 (numeric conversion: 163D-2). This integrated value calculation may be performed by means of a calculation of moving average deviations (method of obtaining a data average while moving).

$$I=\Sigma P \quad \text{Equation 1}$$

This integrated value I is a contrast evaluation value, which is a value representing a contrast amount for each row-i within the specific area IM centered on the selected focus detecting area AFP7.

Now considering that a correlation operation is performed for the contrast evaluation values on each row-i and the position of minimal value thereof is deemed as being the focal point, it may be advantageous to add or multiply a coefficient for weighting the center and its neighbors of each row-i value to be accumulated in the accumulating calculation according to the above Equation 1, because the calculation accuracy is better for contrast in the vicinity of the center at the time of focal detecting calculation to be described later.

$$I=\Sigma \alpha P \quad \text{Equation 2}$$

In Equation 2, $\exp\{-k(x-n/2)^2\}$ may be employed as the coefficient α for weighting the center and its neighbors of the integrated value I, for example.

The integrated value I for each row-i is then compared with that of the other row thereby to detect row-i which presents the highest contrast, and the relevant information is output to a region setting unit 163E (maximum value detection: 163D-3). For example in focus detecting area AFP7 as shown in FIG. 4C, when the contrast evaluation value for the eighth row indicated by arrow is the largest, the focus detecting is to be performed at the eighth row. Thus determined signal sequences of the eighth row have respective set of micro lenses, and as such the detected signal sequence information is output from the region setting unit 163E to the image signal extracting unit 163F.

If, at this time, a plurality of signal sequences exist to present the most large integrated value I as the contrast evaluation value, it is programmable to select a signal sequence located at the most center of the specific area IM, for example. Alternatively, in the case where the focus detecting area AFP is selected by the manual operation of a photographer, it is also programmable to select a signal sequence well reflecting the intention of the photographer, for example, a signal sequence of the closest to the focus detecting area AFP (if a plurality of them exist, the signal sequence located at the most center may also be selected).

The region setting unit 163E sets the focus detecting area centering on a focus detecting sequence in which the contrast evaluation value detected by the feature detecting unit 163D is maximized. Note that, according to the present embodiment, even if the extracted focus detecting sequence exists at a position depart from the center of focus detecting area AFP, another focus detecting area may be set so as to center on the focus detecting sequence. Thus, according to the present embodiment, the optimal focus detecting area is set with the area of high contrast regardless of the contrast at the selected focus detecting area AFP.

The image signal extracting unit 163F reads out from the memory 163B the output signals from the plurality of photoelectric conversion elements 162a corresponding to micro lenses 161a within the focus detecting area set by the region setting unit 163E, and generates a focus detecting signal, i.e. a pair of signal sequences for focus detecting, which presents an image shift amount caused from a pair of light fluxes having passed through different pupil areas of the shooting lenses 210. Thus, the image signal extracting unit 163F extracts a first signal sequence {aj} and a second signal sequence {bj} (j is natural number), and outputs the first and second signal sequences to an image shift amount calculation unit 163G.

The image shift amount calculation unit 163G executes an image shift calculation using the first signal sequence {aj} and the second signal sequence {bj}, thereby to calculate a defocus amount. In this calculation, a correlation calculation value Dk with respect to a pair of images (signal sequences) is initially calculated from the following equation utilizing the first signal sequence {aj} and the second signal sequence {bj}.

$$Dk=\Sigma|a_{i+k}-b_i| \quad \text{Equation 3}$$

Because Dk given by Equation 3 takes discrete values, the minimum value thereof may be regarded as existing in the vicinity of true minimum value. Therefore, the shift amount x is calculated by means of an interpolation utilizing two Dk values previous and next to the minimum value of Dk. Assuming that each spatial variation of the first signal sequence [aj] and the second signal sequence {bj} is given by a sinusoidal variation, then the function D(x) regarded as a continuous function takes absolute values of the sinusoidal curve, thus the position where D(x) becomes minimal may be obtained easily by a linear approximation based on the discrete values of Dk.

Figure 6:
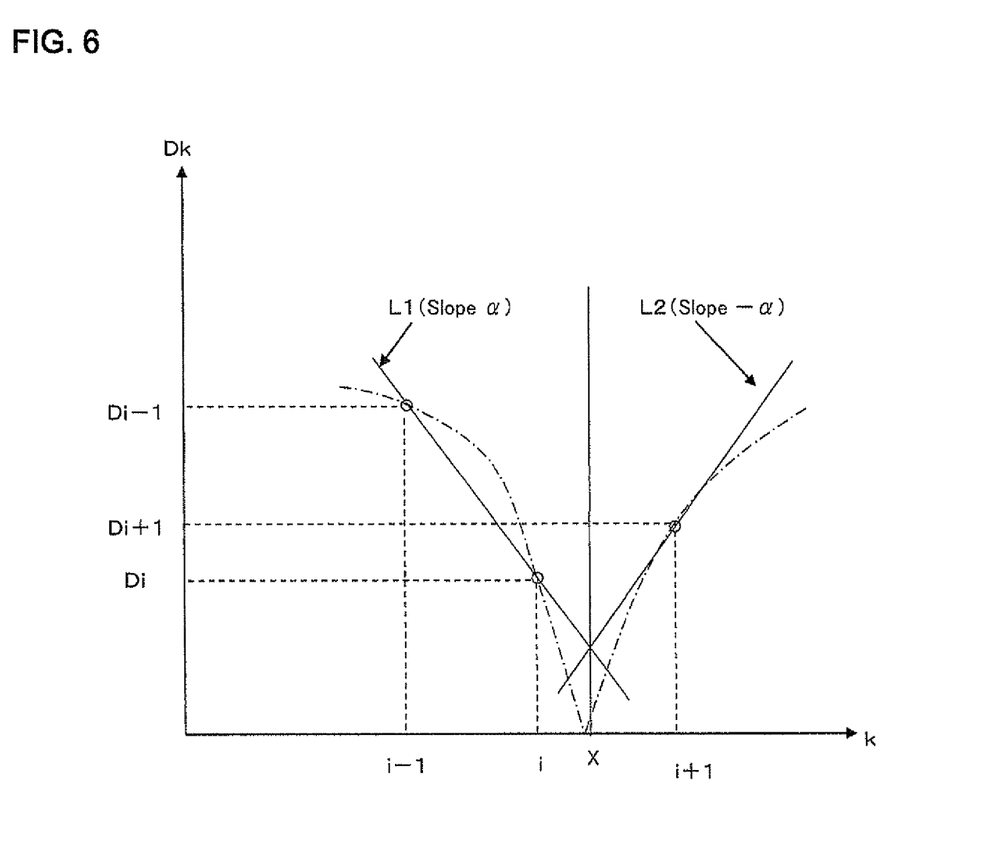
FIG. 6 is a graph for describing a method of calculating a shift amount x in the focus detecting apparatus of the camera illustrated in FIG. 1.

As shown in FIG. 6, let the minimum Dk be Di, and Dks adjacent thereof be Di+1 and Di−1. Greater one is selected from Di+1 and Di−1. In this example illustrated in FIG. 6, Di−1 greater than Di+1 is selected. Thereafter, the selected Di−1 and Di are connected by a straight line L1 having a slope α. Then, a straight line L2 having a slope −α and passing through Di+1 is assumed, and the intersection point of straight lines L1 and L2 is obtained. Thus, x of the intersection point gives the shift amount x described above. The shift amount x may be output directly from the focus detecting calculation unit 163 or via a defocus amount calculation unit 163H after being converted to a defocus amount corresponding to the shift amount x.

Referring again to FIG. 2, the lens driving amount calculation unit 164 receives the shift amount x transmitted from the focus detecting calculation unit 163, and calculates a lens driving amount Δd for causing the shift amount x to be zero, thereafter outputting the calculated result to the lens driving controller 165.

The lens driving controller 165 transmits a driving command to the lens driving motor 230 while receiving the lens driving amount Δd transmitted from the lens driving amount calculation unit 164, and drives the focus lens 211 in accordance with the lens driving amount Δd.

As described above, the present embodiment provides the camera 1 in which the focus detecting sequence is detected to be of the highest contrast evaluation value and the focus detecting is performed for this detecting sequence with the highest contrast evaluation value. Therefore, the contrast of a subject to be a target may be appropriately detected.

More specifically, although focusing onto the face of a person is commonly performed at the time of shooting, human skin has less contrast thereby being unsuitable for focus detecting. In addition, pinpoint focusing on the position of human eye is also performed. However, the conventional camera merely allows a photographer to perform such pinpoint focusing of the focus detecting by moving the camera body. Although a plurality of focus detecting areas are assigned within a view finder, it is unable to automatically positioning either of such focus detecting areas onto a pinpoint position such as human eye.

On the contrary, the camera 1 according to the present embodiment detects a signal sequence which provides the largest contrast evaluation value within a specific area including the selected focus detecting area AFP. Therefore, even though a focus detecting area includes human skin having less contrast or the focus detecting area is not positioned on human eye, focus detecting may be performed within a certain area selected as being an area with the largest contrast.

Another Embodiments

In the above-described embodiments, the micro lens array 161 having circular formed micro lenses 161a arranged squarely and illustrated in FIG. 3B is used. Alternatively, a micro lens array 161 having regular hexagonal micro lenses 161a arranged densely in a honeycomb structure may be used.

Note, however, that the micro lens array 161 with regular hexagonal micro lenses 161a arranged densely in a honeycomb structure has its odd-numbered rows and even-numbered rows shifted by a half pitch with each other, and consequently the calculation method is different from the case of the above-mentioned micro lens array 161 shown in FIG. 3B, for example, in generating pan-focus image shown in FIG. 4C. Centering such different points, another embodiments using the micro lens array 161 with regular hexagonal micro lenses 161a arranged densely in a honeycomb structure will be described hereinafter.

Figure 7A:
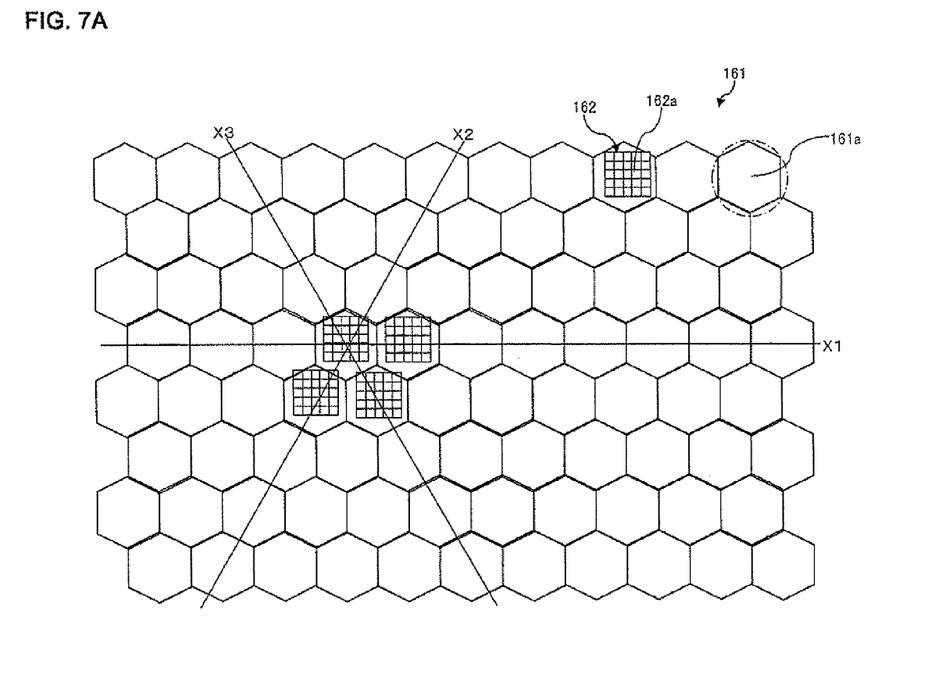
FIG. 7A is a plan view illustrating a placement relationship of a focus detecting optical system and a focus detecting sensor of the camera illustrated in FIG. 1 according to another embodiment.
Figure 7B:
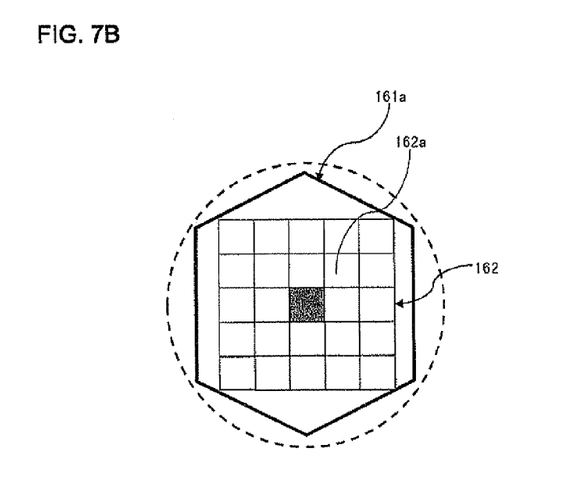
FIG. 7B is an enlarged plan view illustrating a certain portion of the focus detecting optical system and the focus detecting sensor illustrated in FIG. 7A.

FIG. 7A is a plan view illustrating an arrangement status of the focus detecting optical system 161 and the focus detecting sensor 162 seen from the sub mirror 122 to the micro lens array 161 according to the another embodiment. The photoelectric conversion elements 162a are illustrated in the same figure behind only some of the micro lenses 161a, it is to be understood, however, that the photoelectric conversion elements 162a exist in a similar manner behind other ones. FIG. 7B is an enlarged plan view illustrating one focus detecting optical system (micro lens) 161a and one focus detecting sensor (photoelectric conversion element) 162.

The focus detecting optical system 161 according to the present embodiment is provided as a micro lens array having a plurality of micro lenses 161a arranged densely in a two-dimensional plane (in a honeycomb structure) as illustrated in FIG. 7A, and is allocated adjacent to the position P1 to be a possible focusing plane of the shooting lenses 210, as similarly to the above-mentioned embodiment illustrated in FIG. 3A.

In contrast, the focus detecting sensor 162 is provided as a photo-detector array having a plurality of photoelectric conversion elements 162a arranged densely and squarely in a two-dimensional plane, as illustrated in FIG. 7A, and is allocated approximately on focal points of the micro lens array 161, as similarly to the above-mentioned embodiment illustrated in FIG. 3C.

Each micro lens 161a according to the present embodiment is formed as being cut out from a circular formed micro lens with a lens surface indicated by dashed line in FIG. 7B into a regular hexagon, and has similar functional capability with the circular formed micro lens. Thus, the micro lens array 161 is formed as being arranged with such regular hexagonal micro lenses 161a in a honeycomb structure.

Arranging regular hexagonal micro lenses 161a in a honeycomb structure in such a manner enables to avoid dead zones of focus detecting which may occur in the case of arranging circular formed micro lenses. Directions of up-and-down and left-and-right indicated in the same figure are similar to those in an image picked up by the image sensor 110.

On the other hand, the photo-detector array 162 provided behind the micro lens array 161 has, as similarly to the above-mentioned embodiment, a plurality of square shaped photoelectric conversion elements 162a arranged squarely. Each of the photoelectric conversion elements 162a is formed smaller than each micro lens 161a, and therefore, as enlarged and illustrated in FIG. 7B, a plurality of photoelectric conversion elements 162a are included in an area to which one micro lens 161a is projected perpendicularly.

The micro lens array 161 configured in such a manner according to the present embodiment has regular hexagonal micro lenses 161a arranged in a honeycomb structure, as illustrated in FIG. 7A, and therefore the sequence or the arrangement of image data becomes to have a honeycomb structure. Consequently, at the time of generating a two-dimensional image in the two-dimensional image generating unit 163C shown in FIG. 2, the image data may not be converted as it stands to a pixel arrangement of square arrangement with equal intervals.

That is, the positions of centers of respective micro lenses 161a in micro lens array 161 are arranged alternatively between even-numbered row and odd-numbered row, and if the pitch in vertical direction is one (arbitral unit), the pitch in horizontal direction is different as being $2/\sqrt{3}$ (arbitral unit). Given the foregoing, the two-dimensional image generating unit 163 according to the present embodiment rearranges the image data of such honeycomb arrangement into a square arrangement with equal intervals by performing an interpolation operation or an extrapolation operation. After generating the pan-focus two-dimensional image rearranged in a square arrangement, similar processes as the above-described embodiments may be performed.

Also according to the present embodiment, the focus detecting sequence is detected to be of the highest contrast evaluation value and the focus detecting is performed for this detecting sequence with the highest contrast evaluation value, and therefore the contrast of a subject to be a target may be appropriately detected It is to be noted that, although the photo-detector array 162 is illustrated in FIGS. 3B and 7A as having 25 (five in vertical by five in horizontal) of photoelectric conversion elements 162a arranged squarely for each micro lens 161a, the number and the arrangement of the photoelectric conversion elements 162a for each micro lens 161a are not limited to those illustrated. Alternatively to arranging the photoelectric conversion elements 162a for each micro lens 161a as illustrated in these figures, one photo-detector array 162 may be provided for the plurality of micro lenses 161a or for the micro lens array 161 in its entirety. Furthermore, alternatively to squarely arranging the square shaped photoelectric conversion elements 162a, regular hexagonal photoelectric conversion elements may be arranged in a honeycomb structure.

Moreover, in the above-described embodiments, the focus detecting sensor 162 is provided as a two-dimensional sensor separate from the image sensor 110. Alternatively, micro lenses 161a and photoelectric conversion elements 162a may be provided as a portion of the image sensor 110 in a similar manner, thereby to enable focus detecting through the procedure described above.

What is claimed is:

1. A focus detecting apparatus comprising:
a micro lens array arranged with a plurality of micro lenses;
a photo-detector that has detecting elements provided in correspondence with the micro lenses and receives light flux from an optical system via the micro lenses;
a center detecting means that detects a center position of each micro lens from a position of detecting element having conjugate relationship with a pupil position of the optical system;
an image generating means that generates a two-dimensional image from the center position of each micro lens and an output of the photo-detector;
a contrast detecting means that detects contrast values of image signal of the two-dimensional image;
a calculation means that calculates an integrated value to be obtained by accumulating the contrast values for each of a plurality of partial images from the two-dimensional image; and
a focus detecting means that detects a focus adjustment status by calculating an image shift amount caused from light fluxes having passed through different pupil areas of the optical system based on output of the detecting elements corresponding to any of the partial images from which a maximum value is obtained among the integrated values calculated by the calculation means.

2. The focus detecting apparatus as recited in claim 1, wherein
the contrast detecting means is a differentiation filter adapted to operate for output of the detecting elements, and contrast values within an area according to an arrangement size of the differentiation filter are eliminated.

3. The focus detecting apparatus as recited in claim 1, wherein
the calculation means calculates the integrated value after maximally weighting the contrast values corresponding to a center area of each partial image.

4. The focus detecting apparatus as recited in claim 1, wherein
the photo-detector has a plurality of the detecting elements for each of the plurality of micro lenses, and
the contrast detecting means detects the contrast values of the image signal based on output obtained by a part of the plurality of detecting elements for each micro lens.

5. The focus detecting apparatus as recited in claim 1, wherein
the micro lens array is adapted to have the plurality of micro lenses arranged in a honeycomb structure, and
the calculation means uses, as the partial images, images based on output of detecting elements corresponding to a plurality of rows of micro lenses arranged in the honeycomb structure.

6. The focus detecting apparatus as recited in claim 5, wherein
the contrast detecting means obtains output corresponding to a position between adjacent detecting elements by performing interpolation and uses a differentiation filter for the interpolated output thereby to detect the contrast values.

7. An imaging apparatus comprising a focus detecting apparatus, the focus detecting apparatus comprising a focus detecting apparatus as recited in claim 1.

* * * * *